(12) United States Patent
Shin et al.

(10) Patent No.: US 8,832,952 B2
(45) Date of Patent: Sep. 16, 2014

(54) APPARATUS FOR MEASURING OUTER DIAMETERS OF FUEL RODS OF NUCLEAR FUEL ASSEMBLY

(75) Inventors: Jung Cheol Shin, Daejeon (KR); Soon Ki Kim, Daejeon (KR); Jin Man Joo, Daejeon (KR); Dae Hee Kang, Daejeon (KR)

(73) Assignee: Kepco Nuclear Co., Ltd., Daejeon (KR)

( * ) Notice: Subject to any disclaimer, the term of this patent is extended or adjusted under 35 U.S.C. 154(b) by 517 days.

(21) Appl. No.: 13/335,158

(22) Filed: Dec. 22, 2011

(65) Prior Publication Data

US 2013/0008041 A1    Jan. 10, 2013

(30) Foreign Application Priority Data

Jul. 8, 2011    (KR) .................. 10-2011-0067726

(51) Int. Cl.
G01B 1/00 (2006.01)
G01B 7/12 (2006.01)
G21C 17/06 (2006.01)
G01B 5/08 (2006.01)

(52) U.S. Cl.
CPC .. G01B 5/08 (2013.01); G01B 7/12 (2013.01); G21C 17/06 (2013.01)
USPC .......................................................... 33/502

(58) Field of Classification Search
USPC .................. 33/502, 501.6, 783, 784, 793
See application file for complete search history.

(56) References Cited

U.S. PATENT DOCUMENTS

| | | | | |
|---|---|---|---|---|
| 4,036,686 A | * | 7/1977 | Weilbacher et al. | 376/251 |
| 4,344,233 A | * | 8/1982 | Albertazzi | 33/501.06 |
| 4,366,711 A | * | 1/1983 | Weilbacher et al. | 73/590 |
| 4,473,951 A | * | 10/1984 | Golinelli et al. | 33/501.6 |
| 4,847,037 A | * | 7/1989 | Scharpenberg et al. | 376/245 |
| 5,070,622 A | * | 12/1991 | Butzin et al. | 33/793 |
| H1262 H | * | 12/1993 | Bacvinskas et al. | 73/620 |
| 6,549,600 B1 | * | 4/2003 | Beier et al. | 73/625 |
| 6,879,653 B2 | * | 4/2005 | Arias et al. | 33/501.6 |
| 2013/0008041 A1 | * | 1/2013 | Shin et al. | 33/502 |
| 2013/0010911 A1 | * | 1/2013 | Shin et al. | 376/245 |

FOREIGN PATENT DOCUMENTS

| | | |
|---|---|---|
| KR | 10-0375046 B1 | 3/2003 |
| KR | 10-2003-0081533 A | 10/2003 |

OTHER PUBLICATIONS

English Language Abstract of KR 10-2001-0048791 A which is an application publication of KR 10-0375046 B1.
English Language Abstract of KR 10-2003-0081533 A.

* cited by examiner

*Primary Examiner* — Yaritza Guadalupe-McCall
(74) *Attorney, Agent, or Firm* — Rabin & Berdo, P.C.

(57) ABSTRACT

Provided is an apparatus for measuring outer diameters of fuel rods of a nuclear fuel assembly, in which the fuel rods are standing upright and are used in a light water reactor. The apparatus includes a support unit fixed to a floor at a lower portion thereof so as to be kept insulated from vibrations caused by external forces, a measuring unit mounted on the support unit and moving up and down to measure the outer diameters of the fuel rods, and a transducer cooperating with the measuring unit, converting the measured outer diameters of the fuel rods into electrical signals, and sending the converted signals to the outside. Thus, the apparatus moves up and down to measure the outer diameters of the fuel rods, so that it can accurately check abnormalities in the outer diameters of the fuel rods.

8 Claims, 5 Drawing Sheets

APPARATUS FOR MEASURING OUTER DIAMETERS OF FUEL RODS OF NUCLEAR FUEL ASSEMBLY

CROSS-REFERENCE TO RELATED APPLICATIONS

The present application claims priority under 35 U.S.C. 119 to Korean Patent Application No. 10-2011-0067726, filed on Jul. 8, 2011, the disclosure of which is expressly incorporated by reference herein in its entirety.

BACKGROUND OF THE INVENTION

1. Field of the Invention

The present invention relates, in general, to an apparatus for measuring outer diameters of fuel rods of a nuclear fuel assembly and, more particularly, to an apparatus for measuring outer diameters of fuel rods of a nuclear fuel assembly, capable of moving up and down to measure the outer diameters of the fuel rods to accurately check for abnormalities in the outer diameters of the fuel rods, and rapidly and efficiently measuring the outer diameters of the fuel rods without having to disassemble the nuclear fuel assembly.

2. Description of the Related Art

Atomic power generation based on a light water reactor is designed to generate energy via the fission of nuclear fuel, use the energy to heat primary cooling water, transmits the energy of the heated primary cooling water to secondary cooling water in a steam generator to generate steam, convert the generated steam into rotational energy with a steam turbine, and produces electricity with a generator.

Generally, an apparatus for measuring the outer diameters of fuel rods of a nuclear fuel assembly is used to measure the outer diameters of the fuel rods that are standing upright in a fuel storage pool of the light water reactor.

The outer diameters of the fuel rods are measured using such an apparatus so as to check the fuel rods for abnormalities.

Examples of the related art include Korean Patent No. 10-0375046, entitled "Gap measuring method for spent fuel rods and its device," Korean Patent Application Publication No. 10-2003-0081533, entitled "Method for ultrasound measurement of layer thickness of cladding tube for nuclear fuel," and so forth.

However, such conventional apparatuses have a problem in that they cannot measure the outer diameter of each fuel rod over its length.

Due to this incomplete measurement of the outer diameter, it is impossible to accurately check the fuel rods for abnormalities and therefore to prevent the life span of the fuel rods from being reduced.

SUMMARY OF THE INVENTION

Accordingly, the present invention has been made keeping in mind the problems occurring in the related art, and the present invention is intended to provide an apparatus for measuring outer diameters of fuel rods of a nuclear fuel assembly, capable of moving up and down to measure the outer diameters of the fuel rods, accurately checking the outer diameters of the fuel rods for abnormalities, hence preventing a life span of the fuel rods from being reduced, and rapidly and efficiently measuring the outer diameters of the fuel rods without having to disassemble the nuclear fuel assembly.

In order to achieve the objective of the invention, according to one aspect of the present invention, there is provided an apparatus for measuring the outer diameters of fuel rods of a nuclear fuel assembly, in which the fuel rods are standing upright and are used in a light water reactor. The apparatus comprises: a support unit fixed to a floor at a lower portion thereof so as to keep the apparatus in a secure state from vibrations caused by external forces; a measuring unit mounted on the support unit and configured to move up and down to measure the outer diameters of the fuel rods; and a transducer configured to cooperate with the measuring unit, configured to convert the measured outer diameters of the fuel rods into electrical signals, and configured to send the converted signals to the outside.

Here, the measuring unit may include: a base mounted on the support unit and configured to move up and down by a pneumatic motor installed on the support unit; and a length adjustor mounted on the base, configured to cooperate with the transducer on one side thereof, and having a pair of contact arms on the other side thereof configured to contact with outer circumferential surfaces of the fuel rods being measured.

The measuring unit can further include a fixture mounted on the base and a roller aligned with the pair of contact arms in a vertical direction.

Further, the transducer may be a linear variable differential transformer (LVDT).

Also, the pair of contact arms may each have enough length to come into contact with at least two fuel rods at the same time.

In addition, the pair of contact arms may include contact recesses formed in both inner surfaces thereof, respectively.

According to the present invention of the aforementioned configuration, the apparatus for measuring outer diameters of fuel rods of a nuclear fuel assembly moves up and down to measure the outer diameters of the fuel rods, so that it can accurately check the outer diameters of the fuel rods for abnormalities and thus prevent the life span of the fuel rods from being reduced.

Further, the apparatus can rapidly and efficiently measure the outer diameters of the fuel rods without having to disassemble the nuclear fuel assembly.

BRIEF DESCRIPTION OF THE DRAWINGS

The objects, features and further advantages of the present invention will be more clearly understood from the following detailed description in conjunction with the accompanying drawings, in which.

DETAILED DESCRIPTION OF THE INVENTION

Reference will now be made in greater detail to exemplary embodiments of the invention with reference to the accompanying drawings.

Figure 1:
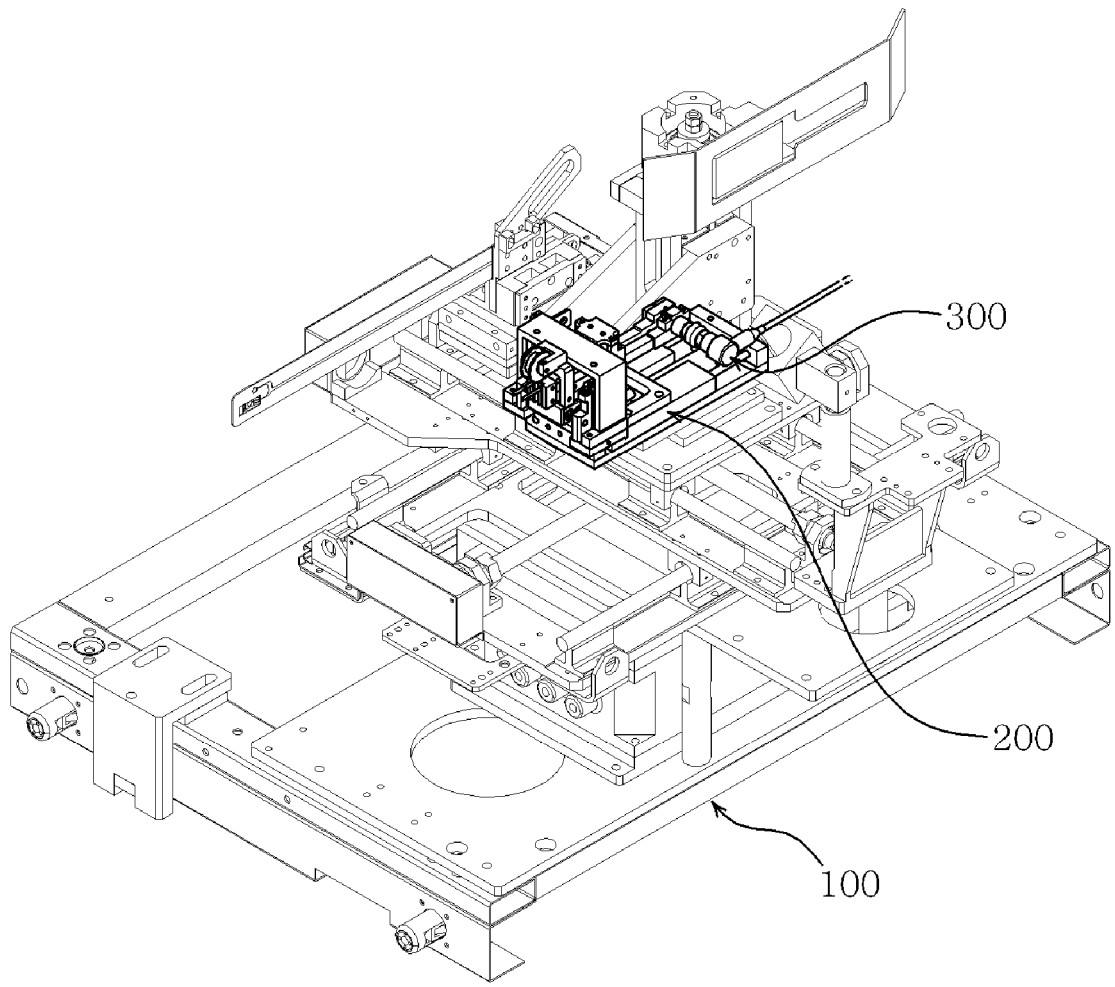
FIG. 1 is a perspective view showing an apparatus for measuring the outer diameters of fuel rods of a nuclear fuel assembly in accordance with an exemplary embodiment of the present invention.
Figure 2:
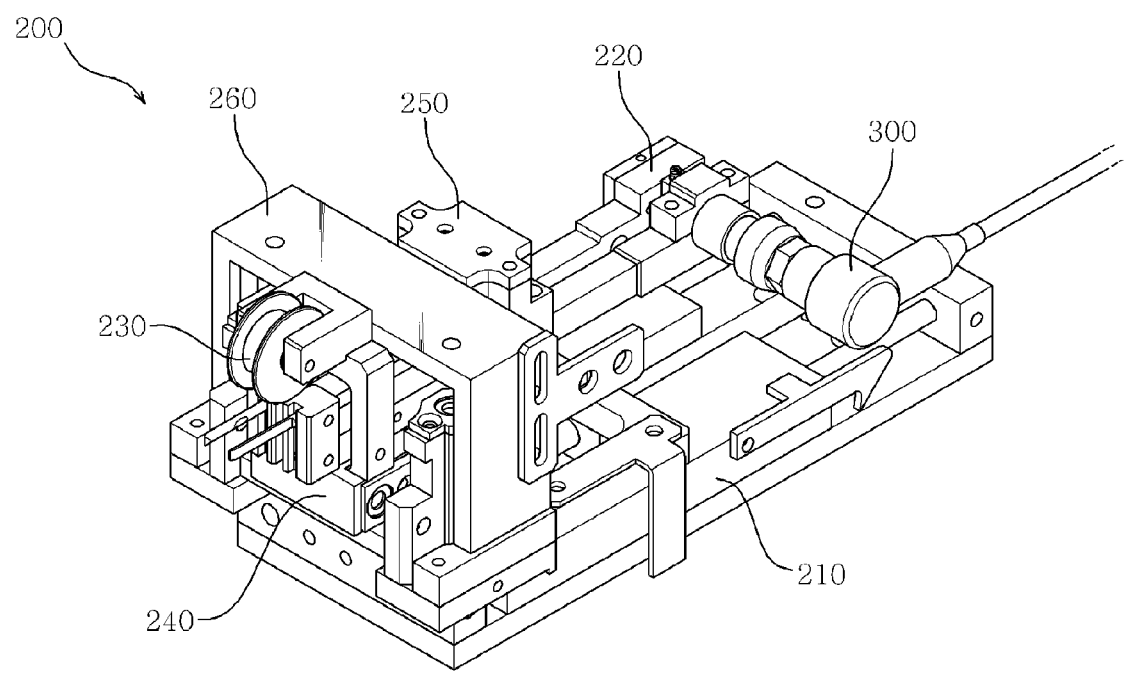
FIG. 2 is a perspective view showing a measuring unit and a transducer of the apparatus for measuring the outer diameters of fuel rods of a nuclear fuel assembly in accordance with the exemplary embodiment of the present invention.
Figure 3:
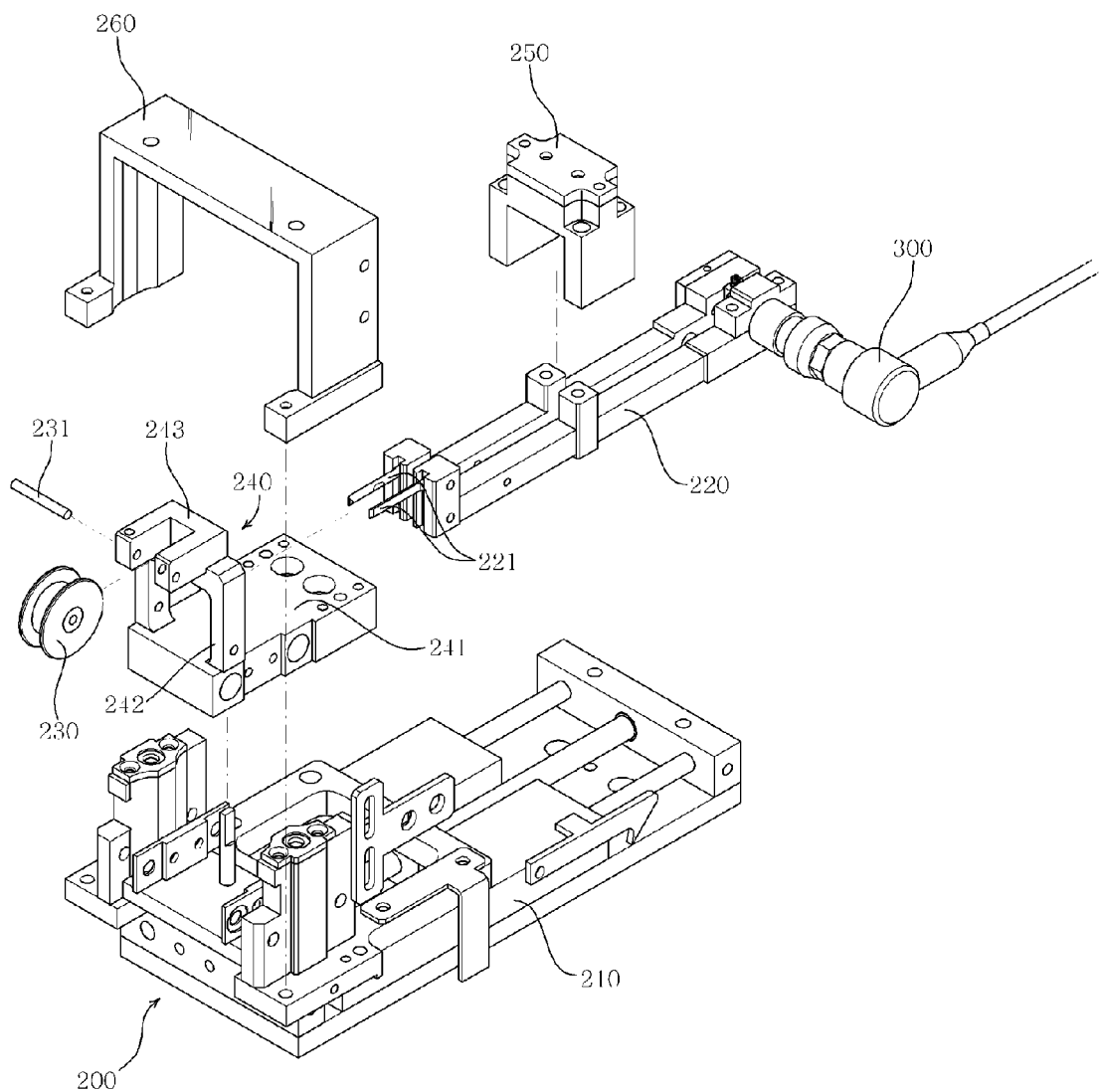
FIG. 3 is an exploded perspective view showing the measuring unit of the apparatus for measuring outer diameters of fuel rods of a nuclear fuel assembly in accordance with the exemplary embodiment of the present invention.
Figure 4:
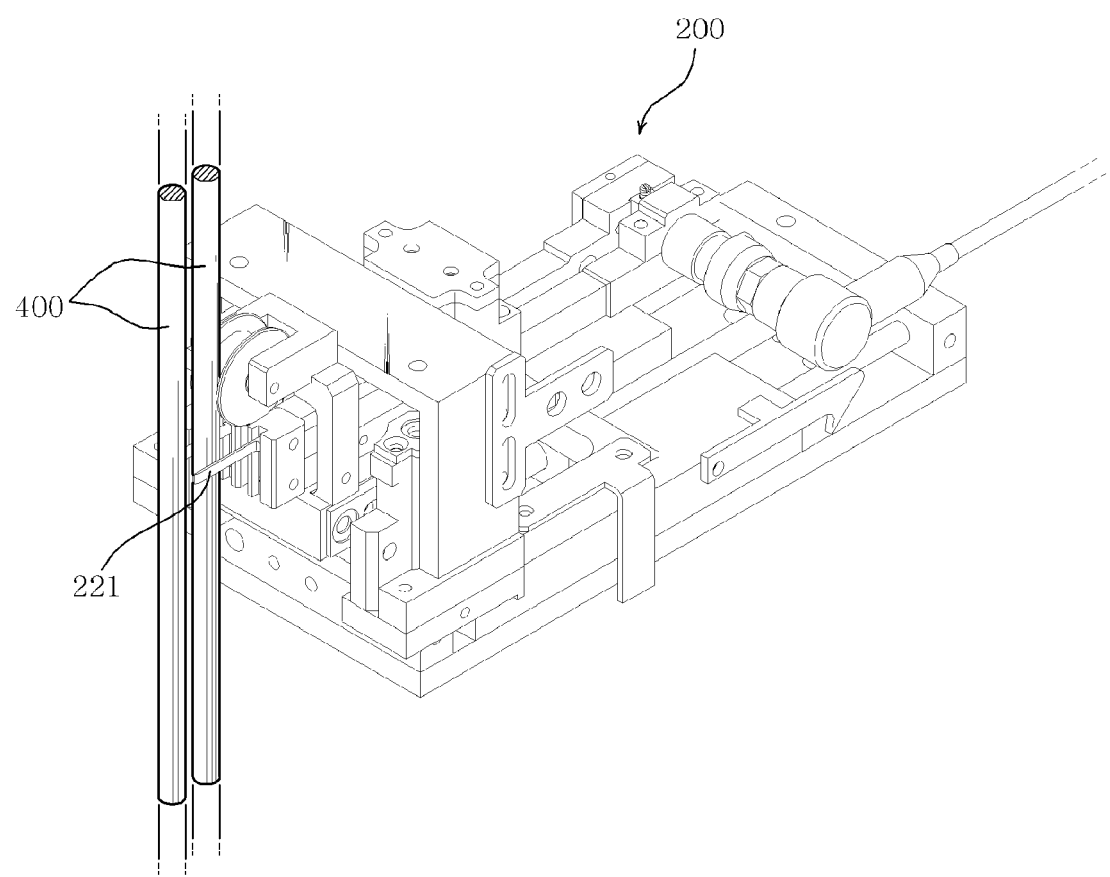
FIG. 4 is a perspective view showing a positional relationship between the measuring unit and fuel rods in accordance with the exemplary embodiment of the present invention.
Figure 5:
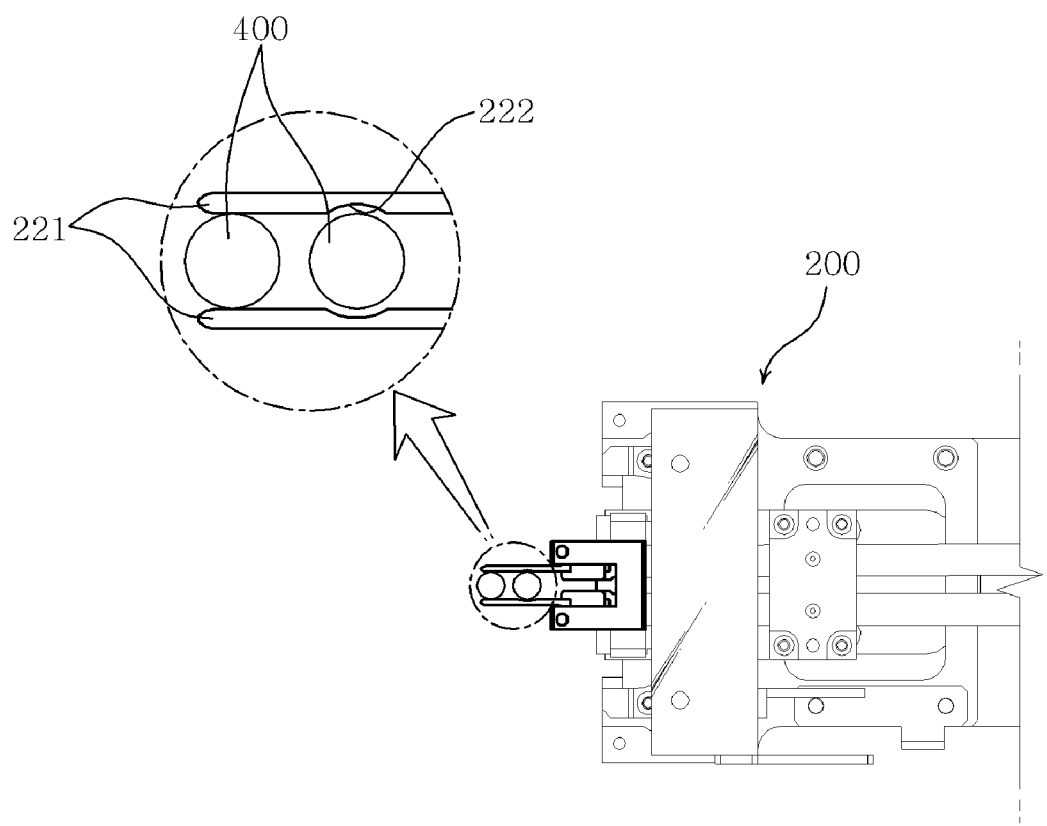
FIG. 5 is a top-down view showing the measuring unit according to the exemplary embodiment of the present invention, in which fuel rods are in contact with a pair of contact arms.

An apparatus for measuring outer diameters of fuel rods of a nuclear fuel assembly in accordance with an exemplary embodiment of the present invention is used to measure outer diameters of fuel rods that stand upright and are used in a light water reactor, as shown in FIGS. 1 to 3. Also, as shown in FIGS. 4 and 5, a measuring unit 200 of the apparatus for measuring outers diameter of fuel rods moves up and down in contact with the fuel rod 400, and measures the outer diameter of the fuel rod 400.

As shown in FIG. 1, the apparatus for measuring outer diameters of fuel rods of a nuclear fuel assembly includes a support unit 100, a measuring unit 200, and a transducer 300.

The support unit 100 has a rectangular shape, and is fixed to a floor at a lower portion thereof so as to keep the apparatus in secure state from vibrations caused by external forces.

The measuring unit 200 is mounted on the support unit 100. The measuring unit 200 is designed to be able to move up and down to measure the outer diameters of the fuel rods 400. Pneumatic motors (not shown) installed on the support unit 100 move the measuring unit 200 freely in horizontal and vertical directions.

As shown in FIGS. 2 and 3, the measuring unit 200 includes a base 210 formed of a wide rectangular plate.

The base 210 is configured so that a fixture 240 having a stretched "Z" shape is fixed to one end of the top surface thereof.

In detail, the fixture 240 includes a fixture plate 241 which is formed of a plate that is smaller than the base 210, and is configured so that the bottom surface thereof is fixed to the top surface of the base 210. The fixture 240 also includes a first U-shaped bracket 242 mounted on one end of the fixture plate 241 in a vertical direction, and a second U-shaped bracket 243 coupled to a top surface of the first U-shaped bracket 242 in a horizontal direction.

The second U-shaped bracket 243 is provided with holes in both arms thereof. A roller 230, which will be described below, is interposed between the arms of the second U-shaped bracket 243, and then a pin 231 is inserted from one of the holes through the center of the roller 230 into the other hole, so that the roller 230 is coupled to the second U-shaped bracket 243.

The roller 230 is formed in the shape of a reel or a cylinder having a groove of a predetermined depth in a radial inward direction. The roller 230 brings the fuel rod 400 into close contact with the groove thereof so as to prevent the fuel rod 400 from moving in left and right directions, so that the roller 230 allows the fuel rod 400 to be guided stably.

A length adjustor 220 is mounted on the base 210. The length adjustor 220 connects with the transducer 300 on one side thereof, and is provided with a pair of contact arms 221 on the other side thereof which come into contact with outer circumferential surfaces of the fuel rods 400 being measured.

To be specific, the length adjustor 220 is formed in a long rod shape, and is placed on the top surface of the fixture plate 241.

The length adjustor 220 is coupled with a coupler 250 in the middle of the contact arms thereof, so that the length adjustor 220 is kept fixed. The coupler 250 is provided with a recess that is wide enough to hold the length adjustor 220, thereby preventing the length adjustor 220 from moving in left and right directions.

A cover 260 is coupled to one end of the top surface of the base 210 and mounted over a space between the fixture 240 and the coupler 250.

The cover 260 has a U shape and is the same width as the base 210.

Meanwhile, as shown in FIG. 4, the length adjustor 220 is configured so that the pair of contact arms 221 is installed on the other side thereof and has a predetermined length enough to come into contact with two or more fuel rods at the same time.

The pair of contact arms 221 is provided with contact recesses 222 in both inner surfaces thereof, respectively.

As shown in FIG. 5, the contact recesses 222 formed in the both inner surfaces of the pair of contact arms 221 have an oval shape, so that one of the fuel rods 400 comes into a space formed by the contact recesses 222.

That is, the contact recesses 222 are to prevent the fuel rod 400 in the space between the contact recesses 222 from interfering with another fuel rod being measured.

The measuring unit 200 is configured to cooperate with the transducer 300 that converts the measured outer diameters of the fuel rods 400 into electrical signals and then sends the signals to the outside.

As shown in FIGS. 2 and 3, the transducer 300 is mounted on one side of the length adjustor 220 that is one component of the measuring unit 200 so as to correspond to the pair of contact arms 221.

The transducer 300 employs a linear variable differential transformer (LVDT) that measures linear displacement and converts it into an electrical signal. The LVDT has three solenoidal coils placed end-to-end around a tube. The center coil is the primary, and the two outer coils are the secondaries. Thus, a cylindrical magnetic core moves along the center of the tube, and sends information about the position of the fuel rod 400 being measured to the outside.

Use and operation of the apparatus for measuring outer diameters of fuel rods of a nuclear fuel assembly having the aforementioned configuration according to the exemplary embodiment of the present invention will be described below.

First, as shown in FIGS. 1 to 3, the measuring unit 200 is mounted on the support unit 100 that is fixed to a floor and thus is kept in a secured state from vibrations caused by external forces.

The mounted measuring unit 200 moves up and down by a pneumatic motor or pneumatic motors installed on the support unit 100.

The measuring unit 200 is configured so that the fixture 240 having a stretched Z shape is fixed to one end of the top surface of the base 210. The fixture 240 is configured to be coupled with the roller 230 in such a manner that the roller 230 is interposed between the arms of the second U-shaped bracket 243, and then the pin 231 is inserted into the holes formed in the arms of the second U-shaped bracket 243.

The length adjustor 220 is placed on the top surface of the fixture plate 241 with the transducer 300 mounted on one side of the length adjustor 220 in advance.

The length adjustor 220 placed on the fixture plate 241 is fitted into and coupled with the coupler 250 in the middle of the arms 221 thereof, so that the coupler 250 covers the width of the length adjustor 220.

Finally, the cover 260 is mounted over a space between the fixture 240 and the coupler 250, and is firmly coupled to the top surface of the base 210.

In the measuring unit 200 coupled in this way, the numerous fuel rods 400 to be measured come into close contact with the pair of contact arms 221 installed on one side of the length adjustor 220.

As shown in FIG. 4, since the measuring unit 200 mounted on the support unit 100 is moved up and down by the pneumatic motors installed on the support unit 100, the measuring unit 200 measures the outer diameter of the fuel rod 400 while moving up and down.

Thus, the measuring unit 200 sends information acquired when measuring the outer diameter of the fuel rod 400 to the outside via the transducer 300 mounted on the other side of the length adjustor 220.

Meanwhile, as shown in FIG. 5, in the state that one of the fuel rods 400 has been brought into the space between the contact recesses 222 formed in both inner surfaces of the pair of contact arms 221, the pair of contact arms 221 measures the outer diameter of the other fuel rod.

Further, when any overlooked or suspicious point is found in the process of measuring the outer diameter of the fuel rod 400, the upward and downward movements of the measuring unit 200 are adjusted using the pneumatic motors installed on the support unit 100, so that it is possible to ensure more accurate measurement.

When other unmeasured fuel rods are to be measured by the measuring unit 200, the nuclear fuel assembly is rotated so that the other unmeasured fuel rods are placed in a measuring position, and then the other unmeasured fuel rods are measured in the aforementioned sequence.

Thus, the measuring unit moves up and down to measure the outer diameters of the fuel rods, so that it is possible to accurately measure the abnormalities in the outer diameter of the fuel rod and to prevent the life span of the fuel rods from being reduced.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An apparatus for measuring outer diameters of fuel rods of a nuclear fuel assembly, the apparatus comprising:
a support unit disposed on a floor at a lower portion thereof;
a measuring unit mounted on the support unit and configured to move up and down to measure the outer diameters of the fuel rods, the measuring unit including
a base mounted on the support unit and moving up and down,
a length adjustor mounted on the base, and
a pair of contact arms installed on the length adjuster and contacting with outer circumferential surfaces of the fuel rods being measured, the pair of contact arms having a predetermined length enough to contact with at least two fuel rods at the same time; and
a transducer configured to convert the outer diameters measured by the measurement unit of the fuel rods into electrical signals, and configured to send the converted signals to the outside.

2. The apparatus as set forth in claim 1, wherein the transducer is a linear variable differential transformer (LVDT).

3. The apparatus as set forth in claim 1, wherein the pair of contact arms includes contact recesses formed in each contact arms.

4. The apparatus as set forth in claim 1, wherein the measuring unit further includes a coupler mounted on the length adjustor and configured to hold the length adjustor firmly.

5. An apparatus for measuring outer diameters of fuel rods of a nuclear fuel assembly, the apparatus comprising:
a support unit disposed on a floor at a lower portion thereof;
a measuring unit mounted on the support unit and moving up and down to measure the outer diameters of the fuel rods, the measuring unit including
a base mounted on the support unit and moving up and down,
a length adjustor mounted on the base,
a pair of contact arms installed on the length adjuster and contacting with outer circumferential surfaces of the fuel rods being measured,
a fixture mounted on the base, and
a roller mounted on the fixture and configured to prevent the fuel rod from moving in a left or a right direction; and
a transducer configured to convert the outer diameters measured by the measurement unit of the fuel rods into electrical signals, and configured to send the converted signals to the outside.

6. The apparatus as set forth in claim 5, wherein the measuring unit further includes a cover mounted over a space between the fixture and the length adjustor and coupled to the base.

7. The apparatus as set forth in claim 5, wherein the fixture comprises:
a fixture plate configured to support the fixture;
a first U-shaped bracket mounted on the fixture plate; and
a second U-shaped bracket mounted on the first U-shaped bracket and configured to support the roller.

8. An apparatus for measuring outer diameters of fuel rods of a nuclear fuel assembly, the apparatus comprising:
a support unit fixed to a floor at a lower portion thereof;
a measuring unit mounted on the support unit and configured to move up and down to measure the outer diameters of the fuel rods; and
a transducer configured to convert the outer diameters measured by the measurement unit of the fuel rods into electrical signals, and configured to send the converted signals to the outside,
wherein the measuring unit includes
a base mounted on the support unit and configured to move up and down by a pneumatic motor installed on the support unit,
a length adjustor mounted on the base and having a pair of contact arms configured to contact with outer circumferential surfaces of the fuel rods being measured,
a fixture mounted on the base,
a roller mounted on the fixture and configured to prevent the fuel rod from moving in a left or a right direction,
a coupler mounted on the length adjustor and configured to hold the length adjustor firmly, and
a cover mounted over a space between the fixture and the length adjustor, and coupled to the base,
wherein the transducer is a linear variable differential transformer (LVDT),
wherein the pair of contact arms has a predetermined length enough to contact with at least two fuel rods at the same time, and includes contact recesses formed in each contact arms, and
wherein the fixture comprises
a fixture plate configured to support the fixture,
a first U-shaped bracket mounted on the fixture plate, and
a second U-shaped bracket mounted on the first U-shaped bracket and configured to support the roller.

* * * * *